(12) United States Patent
Ryder et al.

(10) Patent No.: US 12,701,132 B2
(45) Date of Patent: Aug. 4, 2026

(54) PROACTIVE MITIGATION OF DORMANT ATTACK PATHS

(71) Applicant: Cisco Technology, Inc., San Jose, CA (US)

(72) Inventors: Benjamin William Ryder, Lausanne (CH); Marcelo Yannuzzi, Nuvilly (CH); Jean Andrei Diaconu, Gaillard (FR); Allan Guy Jacques Delautre, Bourbourg (FR); Hervé Muyal, Gland (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/813,287

(22) Filed: Aug. 23, 2024

(65) Prior Publication Data

US 2026/0058979 A1 Feb. 26, 2026

(51) Int. Cl.
*H04L 29/06* (2006.01)
*H04L 9/40* (2022.01)

(52) U.S. Cl.
CPC ............................... *H04L 63/1433* (2013.01)

(58) Field of Classification Search
None
See application file for complete search history.

(56) References Cited

U.S. PATENT DOCUMENTS

| | | | | |
|---|---|---|---|---|
| 12,301,603 B1 * | 5/2025 | Eastman | ............. | H04L 63/1433 |
| 2006/0015715 A1 * | 1/2006 | Anderson | ........... | H04L 63/1408 |
| | | | | 713/154 |

| | | | | |
|---|---|---|---|---|
| 2013/0247203 A1 * | 9/2013 | Nakawatase | .......... | G06F 21/577 |
| | | | | 726/25 |
| 2015/0278517 A1 * | 10/2015 | Weaver | ............... | G06F 11/3698 |
| | | | | 726/26 |
| 2022/0210202 A1 * | 6/2022 | Crabtree | ............... | G06F 21/577 |
| 2023/0021226 A1 | 1/2023 | Bobrov et al. | | |
| 2023/0076372 A1 | 3/2023 | Engelberg et al. | | |
| 2023/0123322 A1 | 4/2023 | Cella et al. | | |
| 2023/0336581 A1 * | 10/2023 | Dunn | .................... | G06F 21/577 |

(Continued)

FOREIGN PATENT DOCUMENTS

| | | | | |
|---|---|---|---|---|
| JP | 2004318759 A | * | 11/2004 | |
| WO | WO-2016119953 A1 | * | 8/2016 | ............ G06F 11/261 |

OTHER PUBLICATIONS

Gulhane V., "How to Build a Digital Twin using LLMs and LoRA Adapters", Medium, Jul. 23, 2023, retrieved from https://medium.com/@vinay.gulhane30/how-to-build-a-digital-twin-using-llms-and-lora-adapters-dff28ee0a790#:~:text=One%20way%20to%20build%20a,that%20are%20accurate%20and%20reliable on May 16, 2024, 8 Pages.

(Continued)

*Primary Examiner* — Benjamin E Lanier
(74) *Attorney, Agent, or Firm* — Merchant & Gould P.C.; Kenneth J. Heywood

(57) ABSTRACT

In one implementation, a device may generate variants of a cloud-native application modified to simulate vulnerabilities. The device may identify dormant attack paths in the variants susceptible to activation. The device may update an attack path knowledge base with the dormant attack paths. The device may prevent changes to the cloud-native application in a production environment that would activate the dormant attack paths identified in the variants.

20 Claims, 8 Drawing Sheets

(56)　　　　　References Cited

U.S. PATENT DOCUMENTS

2024/0054227 A1* 　2/2024　Dahmen ............... G06F 21/566
2024/0114050 A1　　4/2024　Kairali et al.

OTHER PUBLICATIONS

Korolov A., "The Cybersecurity Challenges and Opportunities of Digital Twins", CSO, Dec. 6, 2022, retrieved from https://www.csoonline.com/article/574179/the-cybersecurity-challenges-and-opportunities-of-digital-twins.html on May 16, 2024, 7 Pages.
Lawton G., "Altair—The Marriage of Digital Twins and LLMs", Oct. 6, 2023, retrieved from hps://diginomica.com/altair-marriage-digital-twins-and-llms, 4 Pages.
Microsoft Learn: "Investigating Risk with Security Explorer/attack Paths", Article May 7, 2023, retrieved from https://learn.microsoft.com/en-us/azure/defender-for-cloud/concept-attack-path on May 16, 2024, 4 pages.
Patil R., et al., "Vulnerability Assessment for Virtual Machines in Virtual Environment of Cloud Computing", Springer, Nov. 4, 2018, pp. 569-576.

* cited by examiner

500

700

705 Start

710 GENERATE VARIANTS OF A CLOUD-NATIVE APPLICATION

715 IDENTIFY DORMANT ATTACK PATHS IN THE VARIANTS

720 UPDATE AN ATTACK PATH KNOWLEDGE BASE

725 PREVENT CHANGES TO THE CLOUD-NATIVE APPLICATION

730 End

PROACTIVE MITIGATION OF DORMANT ATTACK PATHS

TECHNICAL FIELD

The present disclosure relates generally to computer networks, and, more particularly, to proactive mitigation of dormant attack paths.

BACKGROUND

Existing attack path analysis techniques are fundamentally reactive. They typically focus on a running an application in the cloud and/or on-premises and identifying weaknesses and exploitable vulnerabilities that are currently present in the application deployment. Some attack paths with wide-ranging impacts may become viable with small and/or accidental changes to the application, such as elevating a single container's privileges.

The impact of these changes is usually not visible until they are made effective and affect a production system. By the time they are detected and flagged (e.g., by a Cloud-Native Application Protection Platform (CNAPP)), these vulnerabilities may have already been exploited. For instance, the dwell time of an attacker in a system might be in the timeframe of weeks (e.g., while assessing various options and attempting lateral movements that remain undetected), whilst existing CNAPP solutions typically scan applications in production once or twice a day. Hence, a deployed change might give an attacker that is already in the system a significant time window (e.g., of several hours) to exploit an attack path that has become active due to a simple configuration change.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
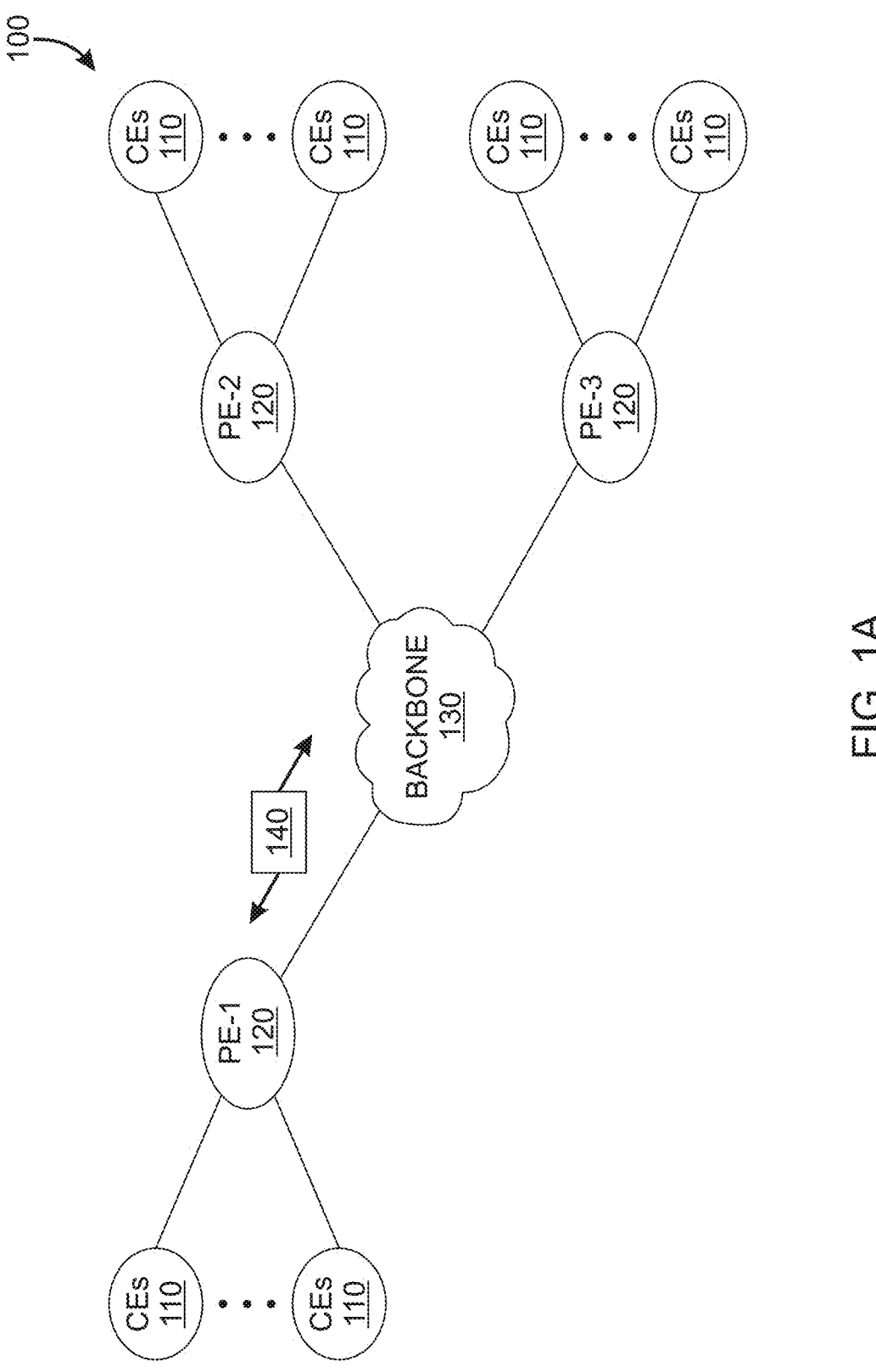
FIGS. 1A-1B illustrate an example communication network.

According to one or more implementations of the disclosure, a device may generate variants of a cloud-native application modified to simulate vulnerabilities. The device may identify dormant attack paths in the variants susceptible to activation. The device may update an attack path knowledge base with the dormant attack paths. The device may prevent changes to the cloud-native application in a production environment that would activate the dormant attack paths identified in the variants.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers (e.g., CE router(s) 110) may be interconnected with provider edge (PE) routers (e.g., PE router(s) 120) (e.g., PE-1, PE-2, and PE-3) in order to communicate across a core network, such as an illustrative network backbone (e.g., network backbone 130). For example, CE router(s) 110, PE router(s) 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router(s) 110 shown in computer network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to computer network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., CE router(s) 110) connected to PE-2 and a second CE router (e.g., CE router(s) 110) connected to PE-3.

Figure 1B:
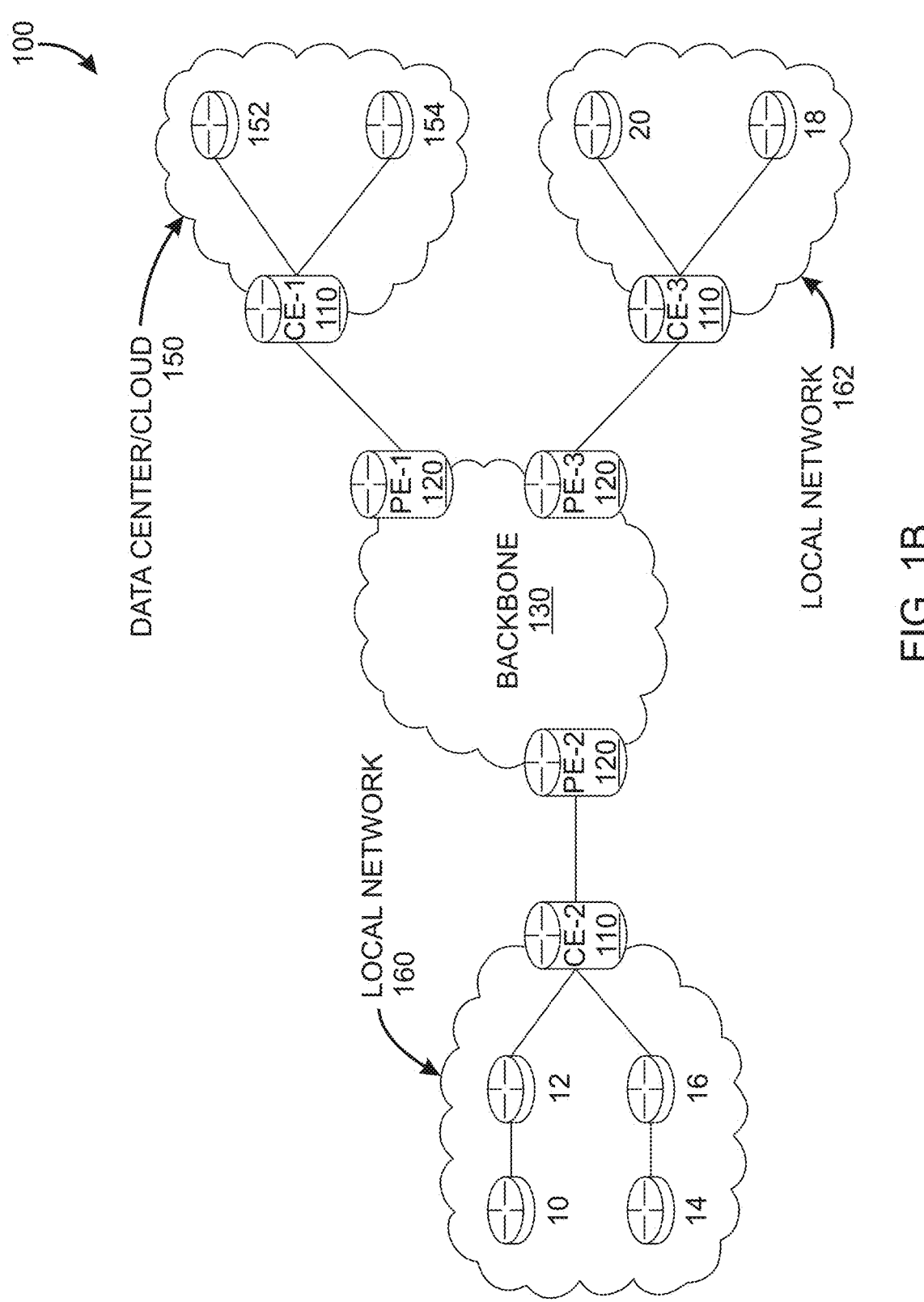

FIG. 1B illustrates an example of computer network 100 in greater detail, according to various implementations. As shown, network backbone 130 may provide connectivity between devices located in different geographical areas and/or different types of local networks. For example, com-puter network 100 may comprise local/branch networks (e.g., network 160, network 162) that include devices/nodes 10-16 and devices/nodes 18-20, respectively, as well as a data center/cloud environment 150 that includes servers 152-154. Notably, local networks (e.g., network 160, network 162) and data center/cloud environment 150 may be located in different geographic locations.

Servers 152-154 may include, in various implementations, a network management server (NMS), network performance analytics server, a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in computer network 100 to connect local network (e.g., network 160), local network (e.g., network 162), and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network (e.g., network 160) to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network (e.g., network 160) and data center/cloud environment 150 on top of the various underlying connections. Another feature of SD-WAN is centralized management by a supervisory service that can monitor and adjust the various connections, as needed.

Figure 2:
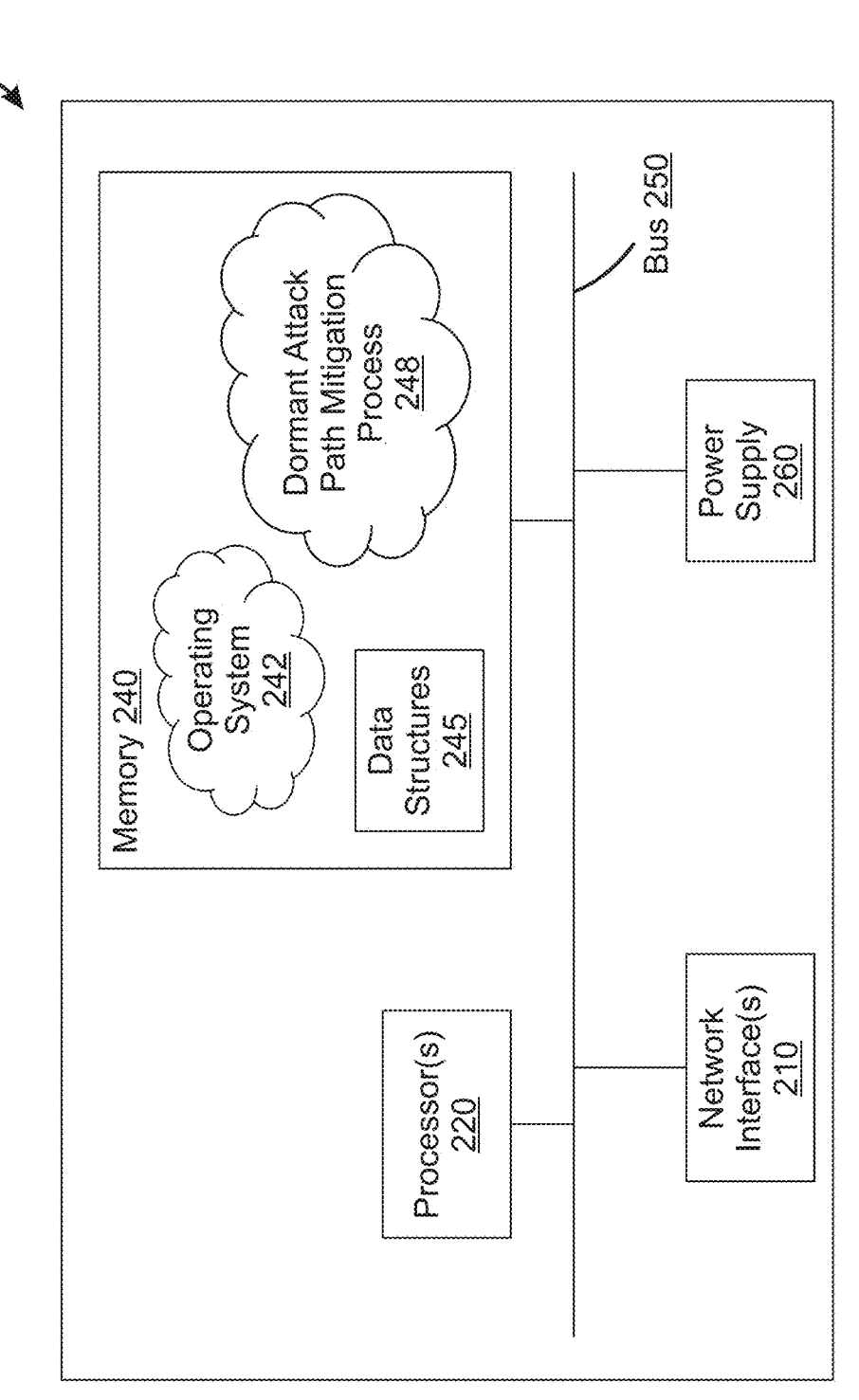
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE router(s) 120, CE router(s) 110, nodes/device 10-20, servers 152-154 (e.g., a network controller/supervisory service located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more of network interfaces 210, one or more of processor(s) 220, and a memory 240 interconnected by a system bus 250, and is powered by a power supply 260.

The network interfaces 210 include the mechanical, electrical, and signaling circuitry for communicating data over physical links coupled to the computer network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a dormant attack path mitigation process 248 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, dormant attack path mitigation process 248 may include computer executable instructions that, when executed by processor(s) 220, cause device 200 to perform the techniques described herein. To do so, in some implementations, dormant attack path mitigation process 248 may utilize and/or involve operations of machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, and c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, dormant attack path mitigation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the dormant attack path mitigation process 248 can employ and/or involve may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, dormant attack path mitigation process 248 may also include and/or involve the operations of one or more generative artificial intelligence/machine learning models. In contrast to discriminative models that simply seek to perform pattern matching for purposes such as anomaly detection, classification, security, threat detection, data privacy, resource allocation, performance optimization, or the like, generative approaches instead seek to generate new content or other data (e.g., audio, video/images, text, etc.), based on an existing body of training data. For instance, in the context of network assurance, dormant attack path mitigation process 248 may use a generative model to generate and/or deploy vulnerable replicases of production applications and/or mitigating dormant attack paths in the applications. Example generative approaches can include, but are not limited to, generative adversarial networks (GANs), large language models (LLMs), other transformer models, and the like.

As noted above, existing attack path analysis techniques are fundamentally reactive, focusing on identifying and mitigating vulnerabilities in running applications deployed in cloud or on premises environments. These methods typically detect vulnerabilities only after they become active in the production system, often leaving a significant time window for attackers to exploit newly activated attack paths traditional solutions, such as those employed by Cloud Native Application Protection Platforms (CNAPPs), generally scan applications periodically, which can result in delays between the introduction of a vulnerability and its detection. This can afford attackers an opportunity to exploit these vulnerabilities before they are mitigated. This reactive approach fails to prevent vulnerabilities from becoming active, leading to increased security risks and potential breaches.

—Proactive Mitigation of Dormant Attack Paths—

In contrast, the techniques described herein introduce a proactive approach to attack path analysis that incorporates dormant attack path mitigation (e.g., identification and prevention). The techniques introduced herein may enhance CNAPP, Cloud Native Detection (CND) systems, and Application Performance and Security Monitoring (APSM) solutions, not only by continuously improving attack path detection but also by automatically preventing changes from being made to the application through closed-loop control. By focusing on the proactive detection of these dormant vulnerabilities before they are deployed, this method enables the identification and prevention of potential threats early in the development life cycle. Integration with CI/CD pipelines allows for continuous monitoring and immediate prevention of changes that could activate these dormant paths, thereby enhancing overall application security and reducing the risk of exploitation.

For example, these techniques may be utilized to automatically generate multiple variants of a running application, its configuration, and runtime environment, which may be modified in a programmatic manner (e.g., by red or purple teams), with the aim of injecting a variety of vulnerabilities and attack paths that were not active in the original application. The variants may target subtle application changes, which are usually not detectable by existing proactive techniques, such as traditional Software Bill of Materials (SBOMs) scanners—the term proactive here may refer to detections made even before the application is deployed in a production environment.

Moreover, the techniques introduced herein may include scanning and assessing the posture of the modified replicas, logging the attack paths detected, and proactively acting, by automatically flagging or preventing changes from being made to the original application (e.g., in a CI/CD testing framework), particularly, when such changes activate attack paths analyzed through the replicas. The techniques introduced herein may particularly target the activation of dormant attack paths, i.e., attack paths that are present but not exploitable in practice, but, given an apparently innocuous configuration change, they may become active thereafter (e.g., after elevating the privileges of a container).

Illustratively, the techniques described herein may be performed by hardware, software, and/or firmware, such as in accordance with dormant attack path mitigation process 248, which may include computer executable instructions executed by the processor(s) 220 (or independent processor of network interfaces 210) to perform functions relating to the techniques described herein.

Specifically, according to various implementations, a device may generate variants of a cloud-native application modified to simulate vulnerabilities. The device may identify dormant attack paths in the variants susceptible to activation. The device may update an attack path knowledge base with the dormant attack paths. The device may prevent changes to the cloud-native application in a production environment that would activate the dormant attack paths identified in the variants.

Figure 3:
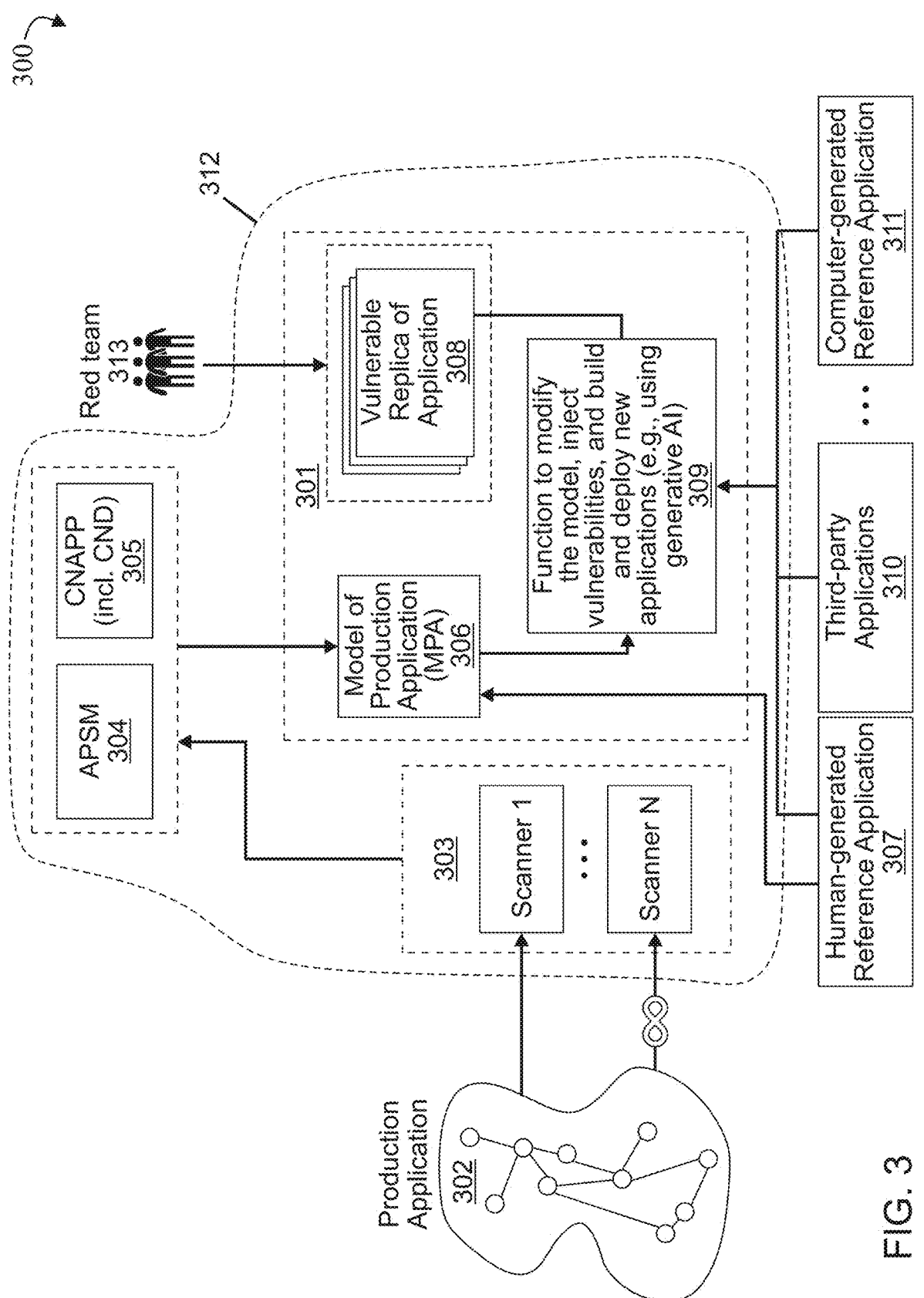
FIG. 3 illustrates an example of a system for proactive mitigation of dormant attack paths applied in an open-loop.

Operationally, FIG. 3 illustrates an example of a system 300 for proactive mitigation of dormant attack paths applied in an open loop. A cloud-native production application (e.g., production application 302) running in the cloud or on-premises will often be assessed by a variety of tools and scanners 303. These tools and scanners 303 may monitor and manage the application and its environment to ensure that performance and security standards are met. The tools and scanners 303 may be part of an application performance and security monitoring system (APSM 304) (e.g., like Cisco AppD), or a cloud-native detection (CND) system that may be part of a cloud-native application protection platform (CNAPP 305) (e.g., like Cisco Panoptica), or other systems.

The tools and scanners 303 may run periodically or in real-time, and they may capture dynamic changes to production application 302 as they are applied at runtime. The data extracted by tools and scanners 303 may typically be available at APSM 304 and/or CNAPP 305, with the aim of providing relevant insights to Security, IT, SRE, or other teams.

By retrieving data from the scanners 303, from APSM 304, and/or from CNAPP 305, and combining the various insights obtained therefrom, a runtime model of a production application (MPA) (e.g., MPA module 306) may be generated. This model may include, but may not be limited to, describing the current application topology and components that are brought together (e.g., frontend, backend, database services, etc.), the deployment configuration for these (e.g., Kubernetes deployments and the corresponding configuration), the containers that are deployed, as well as the CI/CD infrastructure and source code for the different application components. For instance, the source code may be made available to MPA module 306 by the application owners through human-generated reference application 307.

By itself, MPA module 306 could be used to create a replica of production application 302. However, with respect to identifying and mitigating dormant attack paths, the focus may be on the creation of multiple of vulnerable replicas 308 of production application 302. These may be created by means of a function 309 to modify a given model, inject vulnerabilities into it, and build and deploy the applications with the desired vulnerabilities using vulnerable replicas 308.

This function 309 may be used to adapt the MPA module 306 in various ways, including the injection of vulnerabilities and weaknesses, as well as go against "best practices." This process (e.g., programmatic, algorithmic, etc.) may modify the application and/or its environment (e.g., using variants of CloudFormation YAML files). For example, the function 309 may inject vulnerabilities into various application components, and/or change how the application is deployed.

These adaptations may include, but may not be limited to, altering the deployment parameters of an application. In various implementations, the adaptations may particularly target subtle application changes that are typically not detectable by existing proactive techniques, such as traditional SBOM scanners—the term proactive here may refer to detections made even before the application is deployed in a production environment. More specifically, one of the main targets may be the activation of dormant attack paths, i.e., attack paths that are present but not exploitable in practice, but, given an apparently innocuous configuration change, they may become active thereafter.

To this end, function 309 may comprise one or more generative artificial intelligence utilities, custom-trained language models (e.g., large language models (LLMs)), or other means to replace sections of the application code with versions that could be exploited. For instance, this may be achieved by adding an apparently secure library dependency to the application and/or code into a class. While these modifications may not trigger detections using traditional SBOM scanners, an attack path might become active when the cloud configuration for the application deployed in production enables direct access to their runtime (e.g., by enabling a DoS attack to the application).

In various implementations, function 309 may also receive a given attack path as an input, and automatically identify the vulnerabilities that would need to be present in the MPA module 306 for the attack path to become viable, and based on this, inject the missing vulnerabilities and create a new instance in vulnerable replicas 308. In additional implementations, function 309 may randomly generate vulnerabilities and attack paths and apply them to build and deploy an instance of a vulnerable replica of production application 302, which may be used for testing and benchmarking purposes (e.g., of a CNAPP solution).

In addition to enabling the automatic generation of multiple and vulnerable replicas of applications based on the output of various tools that scan and monitor the application, function 309 may also use other inputs to produce vulnerable replicas 308. For instance, function 309 may utilize human-generated reference applications 307. This may facilitate the developers of production application 302 to make their application available to MPA module 306 and function 309, thereby enabling them to create replicas of production application 302 with vulnerabilities present not only in the configuration and/or runtime environment, but also in the code itself.

In further examples, function 309 may utilize third party applications 310 for testing. These may include microservice-based applications or other internal testing applications (e.g., 'BestBags,' 'SockShop,' etc.). Function 309 may also utilize computer-generated and LLM powered reference applications 311 (e.g., 'StreamGenie,' etc.).

The tools and scanners 303 may also include traffic generation and monitoring capabilities, including API traffic visibility, which may be used to augment MPA module 306 with realistic usage patterns and traffic flows through production application 302. These may cover statistical usage patterns based on real-world utilization of the application, historical real-world usage (e.g., capturing, and replaying a given timeframe's worth of usage traffic), or even duplicating real-world and real-time traffic. These usage patterns may then be directly applied to vulnerable replicas 308 of production application 302, to test and assess the posture of the replicas under realistic usage patterns.

FIG. 3 also illustrates the potential demarcation of responsibilities while using the techniques described herein. For instance, the elements comprised under 312 may be provided as a service, where APSM 304 may represent a full-stack observability platform (e.g., Cisco FSO, etc.), CNAPP 305 may be a cloud application security platform (e.g., Cisco Panoptica, etc.), the tools and scanners 303 may be part of any of such systems, while the components 301 may be supplied as a service.

Once built and deployed in their own environments, vulnerable replicas 308 of production application 302 may be used for various purposes. For example, for testing and benchmarking the CNAPP solutions (e.g., CNAPP 305), APSMs 304, scanners, or other systems, to ensure that they will be able to identify a variety of subtle vulnerabilities that may activate dormant or new attack paths. The techniques described herein may also be used for training a "Red Team" 313, i.e., a specialized security group that pretends to be an attacker attempting digital intrusions against the application.

Figure 4:
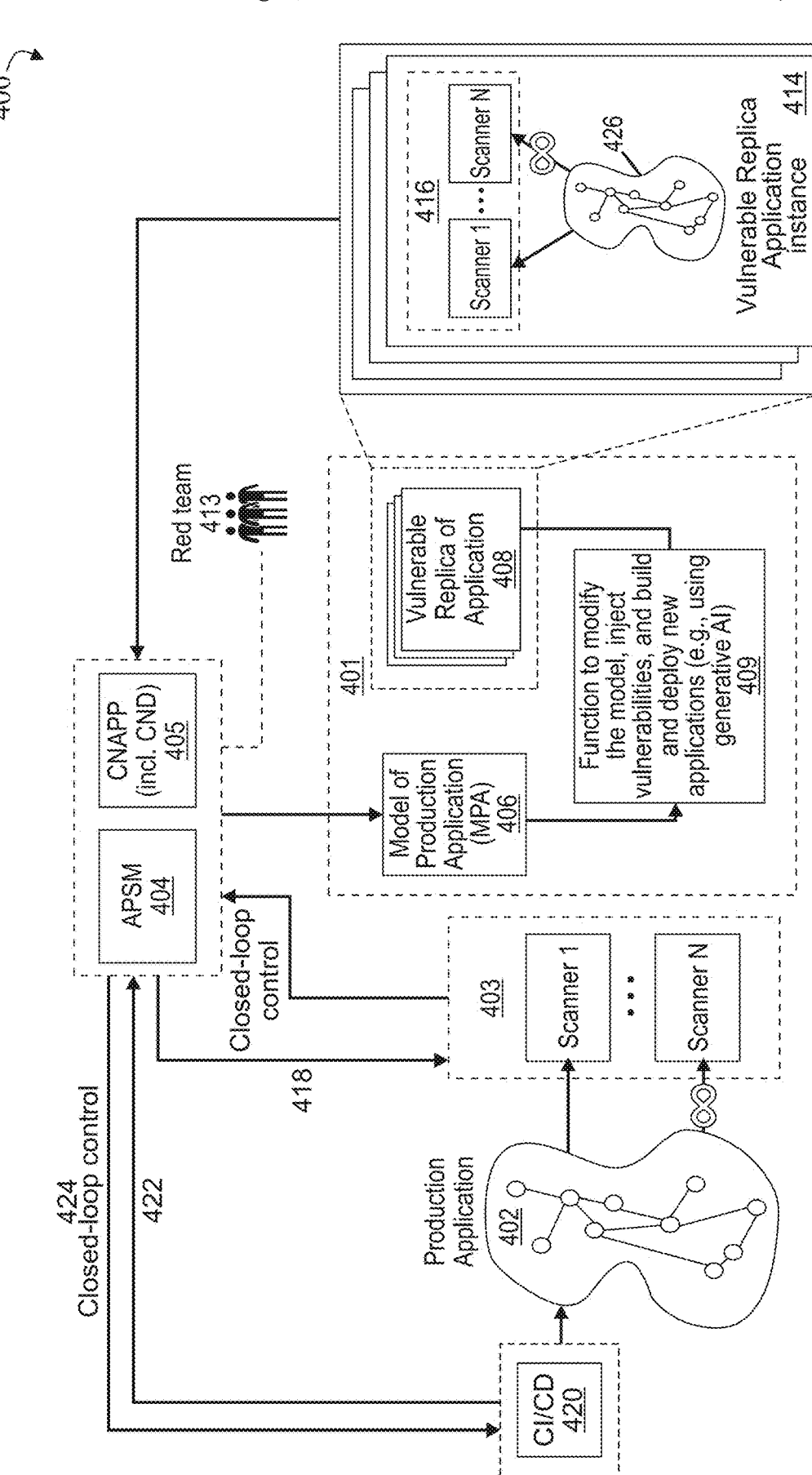
FIG. 4 illustrates an example of an architecture for the deployment and scanning of vulnerable applications thereby facilitating closed-loop controls.

FIG. 4 illustrates an example of an architecture 400 for the deployment and scanning of vulnerable applications thereby facilitating closed-loop controls. Components 401 (e.g., MPA module 406, function 409, vulnerable replicas 408) may facilitate the production of actionable outcomes, including two levels of closed-loop control that may operate at different timeframes.

For example, a set of vulnerable replicas (e.g., vulnerable replicas 408) of production application 402 may be an instantiated and deployed in a testing environment 414, as defined through function 409. The same tools and scanners used in production (e.g., tools and scanners 403) may also be instantiated in the testing environment 414 (e.g., instantiated tools and scanners 416), which may extract signals from vulnerable application instances 426 and send them to APSM 404 and/or CNAPP 405.

Red teams 413 may then assess the detections made through the vulnerable application instances 426 and identify the delta between the total number of expected detections versus the number of effective detections achieved.

This may allow APSM 404 and/or CNAPP 405 solution vendors to systematically evaluate, improve, validate, and/or benchmark their scanning and detection capabilities, including updates 418 to the configuration and/or the code of the tools and scanners 403.

Moreover, rules and/or detection models in tools and scanners 403 may be extended and updated, so as to enable early warnings of potential weak points in the overall production application setup and topology. Therefore, the techniques may proactively enable the scanners to identify cases where, if a vulnerability that was previously analyzed through the replicas is now discovered in an application component, its configuration, and/or its runtime environment, then the APSM 404 and/or CNAPP 405 may be immediately notified of that finding.

Further, these techniques may empower the APSM 404 and/or CNAPP 405 to create targeted warnings, including how other elements of the application may be exploited via the one or more attack paths that were identified thanks to the vulnerable replicas 408. For instance, if a known dormant or innocuous attack path now becomes exploitable due to a change to production application 402 (e.g., tools and scanners 403 detect that production application 402 has a vulnerability present in studied vulnerable application instances (e.g., vulnerable application instances 426)), then APSM 404 or CNAPP 405 may trigger a critical alert as part of the CI/CD pipeline. Furthermore, these techniques may facilitate preemptive remediation to secure the application.

Hence, APSM 404 or CNAPP 405 may have one or more insertion points into CI/CD pipeline 420, and warnings and/or preventive actions may be exercised under closed-loop control. For instance, the commits or code differences of a pull request or deployment change may be provided (e.g., at 422) to APSM 404 and/or CNAPP 405. These updates may act as triggers and may be compared against the commits or code differences needed to create one of the vulnerable replicas in the catalog, and, if a partial or full match is detected (e.g., one that that would enable one or more dormant attack paths to surface), then a pull request or deployment may be prevented (e.g., via closed-loop control 424). More specifically, the techniques described herein may empower APSM 404 and/or CNAPP 405 to log and catalog new findings thanks to the scans, detections, and analysis made through the replicas, and automatically make those findings available to a CI/CD pipeline or a CI/CD testing framework.

Figure 5:
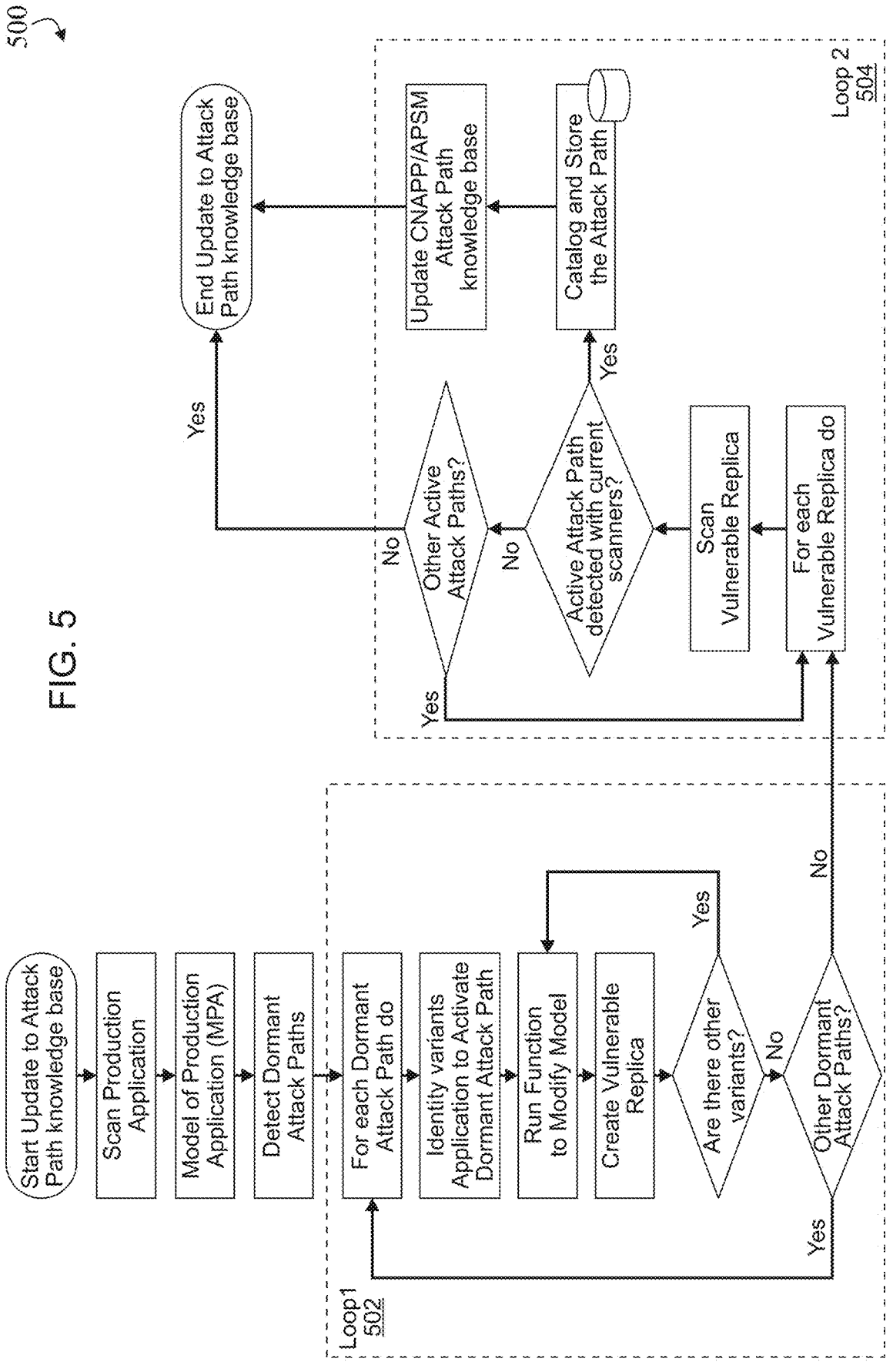
FIG. 5 illustrates an example of a procedure detailing how an attack path knowledge base might be updated when dormant attack paths become active.

FIG. 5 illustrates an example of a procedure 500 detailing how an attack path knowledge base might be updated when dormant attack paths become active. The procedure 500 may include two loops (e.g., loop one 502 and loop two 504), each highlighting distinct phase in the updating process.

The procedure 500 may begin with the initiation of an update to the attack path knowledge base. The production application may be scanned to gather relevant data and a model of the production application (MPA) may be created, representing its current state. The system may then detect dormant attack paths within the MPA.

At this point, procedure 500 may progress through loop one 502. Loop one 502 may include identifying variants of the application that could activate the dormant attack path, run a function to modify the model based on the variants, create vulnerable replicas incorporating the identified variants, and/or check if other variants exist. If other variants exist, then the procedure 500 may repeat running a function to modify the model based on the other variants, creating vulnerable replicas incorporating the other identified variants, and then checking for additional variants. If no other variants exist, then the procedure 500 may proceed to determining whether there are other dormant attack paths. If there are other dormant attack paths, then procedure 500 may proceed to repeat the process of loop one 502 on the next other dormant attack paths. If there are no other dormant attack paths, the procedure 500 may proceed to loop two 504.

In loop two 504 each vulnerable replica may be scanned. For each active attack path detected with the scanner, that detected attack path may be cataloged and/or stored and the CNAPP/APSM attack path knowledge base may be updated. If no active attack paths are detected, then procedure 500 may proceed to scan the next vulnerable replica. As described in loop two 504, the cataloging and storage of attack paths may only take place when the current version of scanners are unable to detect the transition of a dormant attack path to active state. In turn, this new information may be used to update the CNAPP/APSM attack path knowledge base.

Figure 6:
FIG. 6 illustrates an example of a procedure for creating notifications and preventing changes from being pushed to production.
Figure 6:
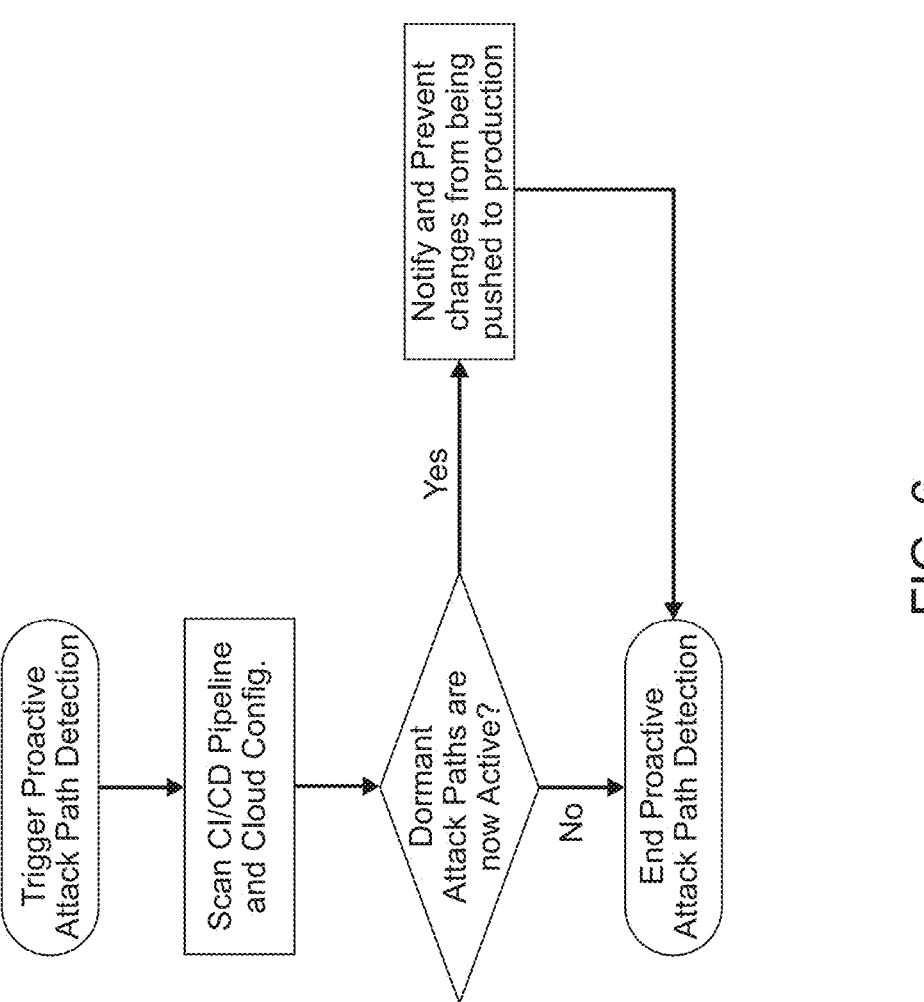

FIG. 6 illustrates an example of a procedure 600 for creating notifications (e.g., alarms, etc.) and preventing changes from being pushed to production (e.g., integrated as part of the CI/CD pipeline). This procedure 600 may leverage proactive scanning and detection to identify and prevent dormant attack paths from transitioning to an active state within a cloud-native application environment.

Procedure 600 may begin with an initiation of the proactive attack path detection. This trigger can be a scheduled event, in response to an update to an attack path knowledge base, a result of specific change detected in the environment, etc. Once triggered, the system may scan the CI/CD pipeline and cloud configuration and evaluated whether any dormant attacks paths have been activated.

If no dormant attack paths are activated, then the procedure 500 may conclude. Conversely, if dormant attack paths are activated, then relevant stakeholders may be notified (e.g., of the dormant attack paths, their activation, the potential vulnerability or consequence of the active attack paths, mitigation measures, etc.) and/or mitigatory measures may be taken that prevent the changes leading to activation of the dormant attack paths from being pushed to the production.

Indeed, APSM or CNAPP may now be equipped to warn against and prevent changes that would lead to vulnerabilities in a production application. For instance, in the case that a proposed change may cause the production application to be subject to one or more of the vulnerabilities studied and analyzed via vulnerable replicas, then the change may be flagged and/or prevented as part of an automated testing pipeline.

As such, these techniques continue to the shift-left of the CNAPP and APSM solutions and further integrate them into CI/CD pipelines. These techniques may further integrate with the scanning of source code and ensuring secure and trustworthy SBOMs, as well as providing a mechanism to further secure applications during their entire life cycle (e.g., from code to runtime).

Figure 7:
FIG. 7 illustrates an example of a simplified procedure for proactive mitigation of dormant attack paths, in accordance with one or more implementation described herein.

FIG. 7 illustrates an example of a simplified procedure for proactive mitigation of dormant attack paths, in accordance with one or more implementation described herein. For example, a non-generic, specifically configured device (e.g., device 200), may perform procedure 700 (e.g., a method) by executing stored instructions (e.g., dormant attack path mitigation process 248).

The procedure 700 may start at step 705, and continues to step 710, where, as described in greater detail above, the device (e.g., a controller, processor, etc.) may generate variants of a cloud-native application modified to simulate vulnerabilities. Generating the variants may include modifying deployment parameters of the cloud-native application to include attack paths that are activated with a configuration change.

Generating the variants may also include identifying, from an attack path input, potential vulnerabilities that need to be present for the attack path input to become viable. Then, the potential vulnerabilities may be injected to create an instance of a variant of the cloud-native application by injecting the potential vulnerabilities into code of the cloud-native application. In various implementations, a generative artificial intelligence may be utilized to automatically replace sections of application code of the cloud-native application with versions that are susceptible to exploitation.

At step 715, as detailed above, a device may identify dormant attack paths in the variants susceptible to activation. Identifying the dormant attack paths in the variants that are susceptible to activation may include instantiating the variants in a testing environment. The dormant attack paths in the variants that are susceptible to activation may be identified by testing the variants by applying realistic usage patterns and traffic flows to the variants in the testing environment. In various implementations, the variants instantiated in the testing environment may be utilized to conduct evaluating automated vulnerability identification utilities and/or training a red team.

At step 720, as detailed above, a device may update an attack path knowledge base with the dormant attack paths. In various implementations, the cloud-native application may be scanned to determine whether the dormant attack paths identified in the variants exist in the cloud-native application.

At step 725, as detailed above, the device may prevent changes to the cloud-native application in a production environment that would activate the dormant attack paths identified in the variants. Preventing the changes may include providing the changes to a continuous integration and continuous delivery environment to automatically detect and block the changes that would activate the dormant attack paths. The changes to the cloud-native application may be prevented from implementation or incorporation prior to the cloud-native application being deployed in the production environment.

Procedure 700 then ends at step 730.

It should be noted that while certain steps within procedure 700 may be optional as described above, the steps shown are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a proactive and innovative approach to enhancing the security of cloud-native applications by leveraging various techniques (e.g., language models, generative AI, human-generated reference applications, third-party applications, etc.) to create multiple variants of an application and its corresponding deployment. These variants, which may include subtle and introduced vulnerabilities, enable the detection of dormant attack paths that might become active due to seemingly innocuous configuration changes. By identifying and cataloging these potential threats before the application is deployed, the system ensures that security measures can be implemented preemptively.

For example, the generation of application variants using techniques such as CloudFormation YAML files allows red teams to inject vulnerabilities at various levels, including the application code, accounts, roles, access privileges, data stores, and cloud environment configurations. This proactive detection method targets changes that are often undetectable by traditional software bill of materials (SBOM) scanners, thereby providing a layer of security that extends beyond current proactive techniques.

Furthermore, the system integrates with CI/CD environments to automatically prevent changes that would activate dormant attack paths, thereby safeguarding the application throughout its development lifecycle. This integration ensures that vulnerabilities are addressed during the testing, staging, and production phases of a cloud application, preventing the transition of dormant attack paths to active states due to minor configuration changes.

These techniques may facilitate the identification and cataloging of attack paths that are not currently exploitable but could become so after minor changes, such as elevating container privileges. This capability may be crucial, particularly when existing shift-left scanners fail to detect the transition of dormant attack paths to active states. By acting proactively and preventing such changes from being implemented in the production environment, these techniques provide robust security measures that protect cloud-native applications from potential exploits before they can occur.

While there have been shown and described illustrative implementations that provide proactive mitigation of dormant attack paths, it is to be understood that various other adaptations and modifications may be made within the spirit and scope of the implementations herein. For example, while certain implementations are described herein with respect to using certain elements, modules, components, architectures, etc. for the purposes of proactive mitigation of dormant attack paths, the elements, modules, components, architectures, etc. are not limited as such and may be used for other functions, in other arrangements, in other functional distributions, in other implementations, etc.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented on a tangible (non-transitory) computer-readable medium (e.g., disks/CDs/RAM/EEPROM/etc.) having computer-executable instructions thereon for execution on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
   generating, by a device, variants of a cloud-native application, wherein the variants include modifications that introduce vulnerabilities that would be exploitable in the variants and not exploitable in the cloud-native application, and wherein generating the variants includes:
   identifying, from an attack path input, potential vulnerabilities that need to be present for the attack path input to become exploitable, and creating an instance of a variant of the cloud-native application by injecting the potential vulnerabilities into code of the cloud-native application;
   identifying, by the device, attack paths in the variants that are exploitable based on the introduced vulnerabilities;
   updating, by the device, an attack path knowledge base with the attack paths; and
   preventing, by the device, changes to the cloud-native application in a production environment that would make one or more of the attack paths identified in the variants exploitable in the cloud-native application.

2. The method of claim 1, wherein generating the variants includes modifying deployment parameters of the cloud-native application to include attack paths that are activated with a configuration change.

3. The method of claim 1, wherein identifying the attack paths in the variants that are exploitable based on the introduced vulnerabilities includes instantiating the variants in a testing environment.

4. The method of claim 3, wherein identifying the attack paths in the variants that are exploitable based on the introduced vulnerabilities includes testing the variants by applying usage patterns and traffic flows derived from the production environment to the variants in the testing environment.

5. The method of claim 3, further comprising:
   utilizing the variants instantiated in the testing environment to conduct one or more of evaluating automated vulnerability identification utilities or training a red team.

6. The method of claim 1, further comprising:
   scanning the cloud-native application to determine whether the attack paths identified in the variants exist in the cloud-native application.

7. The method of claim 1, wherein preventing the changes includes providing the changes to a continuous integration and continuous delivery environment to automatically detect and block the changes that would make one or more of the attack paths exploitable in the cloud-native application.

8. The method of claim 1, further comprising:
   utilizing generative artificial intelligence to replace sections of application code of the cloud-native application with versions that are susceptible to exploitation.

9. The method of claim 1, wherein the changes to the cloud-native application are prevented prior to the cloud-native application being deployed in the production environment.

10. An apparatus, comprising:
   one or more network interfaces to communicate with a network;
   a processor coupled to the one or more network interfaces and configured to execute one or more processes; and
   a memory configured to store a process that is executable by the processor, the process, when executed, configured to:
   generate variants of a cloud-native application, wherein the variants include modifications that introduce vulnerabilities that would be exploitable in the variants and not exploitable in the cloud-native application, and wherein to generate the variants includes to utilize generative artificial intelligence to replace sections of application code of the cloud-native application with versions that are susceptible to exploitation;
   identify attack paths in the variants that are exploitable based on the introduced vulnerabilities;
   update an attack path knowledge base with the attack paths; and prevent changes to the cloud-native application in a production environment that would make one or more of the attack paths identified in the variants exploitable in the cloud-native application.

11. The apparatus as in claim 10, wherein the process when executed is further configured to:

generate the variants by modifying deployment parameters of the cloud-native application to include attack paths that are activated with a configuration change.

12. The apparatus as in claim 10, wherein the process when executed is further configured to:

identify, from an attack path input, potential vulnerabilities that need to be present for the attack path input to become exploitable; and create an instance of a variant of the cloud-native application by injecting the potential vulnerabilities to code of the cloud-native application.

13. The apparatus as in claim 10, wherein the process when executed is further configured to:

identify the attack paths in the variants that are exploitable based on the introduced vulnerabilities by instantiating the variants in a testing environment.

14. The apparatus as in claim 13, wherein the process when executed is further configured to:

identify the attack paths in the variants that are exploitable based on the introduced vulnerabilities by testing the variants in the testing environment by applying usage patterns and traffic flows derived from the production environment to the variants.

15. The apparatus as in claim 13, wherein the process when executed is further configured to:

utilize the variants instantiated in the testing environment to conduct one or more of evaluating automated vulnerability identification utilities or training a red team.

16. The apparatus as in claim 10, wherein the process when executed is further configured to:

scan the cloud-native application to determine whether the attack paths identified in the variants exist in the cloud-native application.

17. The apparatus as in claim 10, wherein the process when executed is further configured to:

prevent the changes by providing the changes to a continuous integration and continuous delivery environment to automatically detect and block the changes that would make one or more of the attack paths exploitable in the cloud-native application.

18. A tangible, non-transitory, computer-readable medium having computer-executable instructions stored thereon that, when executed by a processor on a computer, cause the computer to perform a method comprising:

generating variants of a cloud-native application, wherein the variants include modifications that introduce vulnerabilities that would be exploitable in the variants and not exploitable in the cloud-native application, and wherein generating the variants includes utilizing generative artificial intelligence to replace sections of application code of the cloud-native application with versions that are susceptible to exploitation;

identifying attack paths in the variants that are exploitable based on the introduced vulnerabilities;

updating an attack path knowledge base with the attack paths; and preventing changes to the cloud-native application in a production environment that would make one or more of the attack paths identified in the variants exploitable in the cloud-native application.

19. The tangible, non-transitory, computer-readable medium as in claim 18, wherein generating the variants includes:

identifying, from an attack path input, potential vulnerabilities that need to be present for the attack path input to become exploitable viable, and creating an instance of a variant of the cloud-native application by injecting the potential vulnerabilities into code of the cloud-native application.

20. The tangible, non-transitory, computer-readable medium as in claim 18, wherein identifying the attack paths in the variants that are exploitable based on the introduced vulnerabilities includes instantiating the variants in a testing environment.

* * * * *